United States Patent
Lee et al.

(10) Patent No.: US 9,237,333 B2
(45) Date of Patent: Jan. 12, 2016

(54) METHOD AND APPARATUS OF MEASURING DEPTH INFORMATION FOR 3D CAMERA

(75) Inventors: Jun Haeng Lee, Hwaseong-si (KR);
Hyun Surk Ryu, Hwaseong-si (KR);
Keun Joo Park, Seoul (KR); Chang Woo Shin, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 882 days.

(21) Appl. No.: 13/184,489

(22) Filed: Jul. 15, 2011

(65) Prior Publication Data
US 2012/0105587 A1 May 3, 2012

(30) Foreign Application Priority Data
Nov. 1, 2010 (KR) .................. 10-2010-0107646

(51) Int. Cl.
*G01S 7/487* (2006.01)
*G01S 17/89* (2006.01)
*H04N 13/02* (2006.01)
*G01S 7/486* (2006.01)

(52) U.S. Cl.
CPC ............ *H04N 13/0271* (2013.01); *G01S 7/487* (2013.01); *G01S 7/4861* (2013.01); *G01S 17/89* (2013.01); *H04N 13/0253* (2013.01)

(58) Field of Classification Search
CPC ....... G01S 17/89; G01S 7/4861; G01S 7/487; H04N 13/0253; H04N 13/0271
USPC ........ 348/46, E13.07, 345, 270, 349, E5.042; 257/E27.131, E27.133, E27.151; 356/605, 5.1, 5.04, 4.01, 4.07; 382/106, 154
See application file for complete search history.

(56) References Cited

U.S. PATENT DOCUMENTS

| 6,919,549 | B2 * | 7/2005 | Bamji et al. ............... 250/208.1 |
| 7,016,519 | B1 * | 3/2006 | Nakamura et al. ........... 382/106 |
| 7,157,685 | B2 * | 1/2007 | Bamji et al. ............. 250/214 A |
| 7,362,419 | B2 * | 4/2008 | Kurihara et al. ............. 356/4.07 |
| 7,548,325 | B2 * | 6/2009 | Quach et al. ................ 358/1.11 |
| 7,952,690 | B2 * | 5/2011 | Cauquy et al. ................. 356/5.1 |
| 8,159,598 | B2 * | 4/2012 | Watanabe et al. ............ 348/345 |
| 2006/0157643 | A1 * | 7/2006 | Bamji et al. ............... 250/208.1 |
| 2007/0211258 | A1 | 9/2007 | Lee et al. |
| 2009/0045359 | A1 * | 2/2009 | Kumahara et al. ....... 250/559.38 |
| 2009/0076758 | A1 * | 3/2009 | Dimsdale ....................... 702/97 |
| 2010/0045966 | A1 | 2/2010 | Cauquy et al. |
| 2010/0046802 | A1 | 2/2010 | Watanabe et al. |
| 2010/0231891 | A1 * | 9/2010 | Mase et al. .................... 356/5.01 |

FOREIGN PATENT DOCUMENTS

| JP | 2000-121339 | 4/2000 |
| JP | 2006-084429 | 3/2006 |
| JP | 2008-116309 | 5/2008 |

(Continued)

*Primary Examiner* — Jay Patel
*Assistant Examiner* — Reza Aghevli
(74) *Attorney, Agent, or Firm* — NSIP Law

(57) ABSTRACT

A depth information measuring method and apparatus for a three-dimensional (3D) camera may output, to an object, an optical pulse of which an intensity is higher than an intensity of an ambient light. The depth information measuring method and apparatus may generate a voltage that is proportional to a log value of an intensity of a light reflected from the object. The depth information measuring method and apparatus may use discharging units, and the discharging units may respectively include dischargers having different discharging speeds or capacitors having different capacities.

20 Claims, 8 Drawing Sheets

(56) References Cited

FOREIGN PATENT DOCUMENTS

| JP | 2009-085705 | 4/2009 |
| JP | 2009-085706 | 4/2009 |
| JP | 2009-103627 | 5/2009 |
| JP | 2009-236650 | 10/2009 |

* cited by examiner

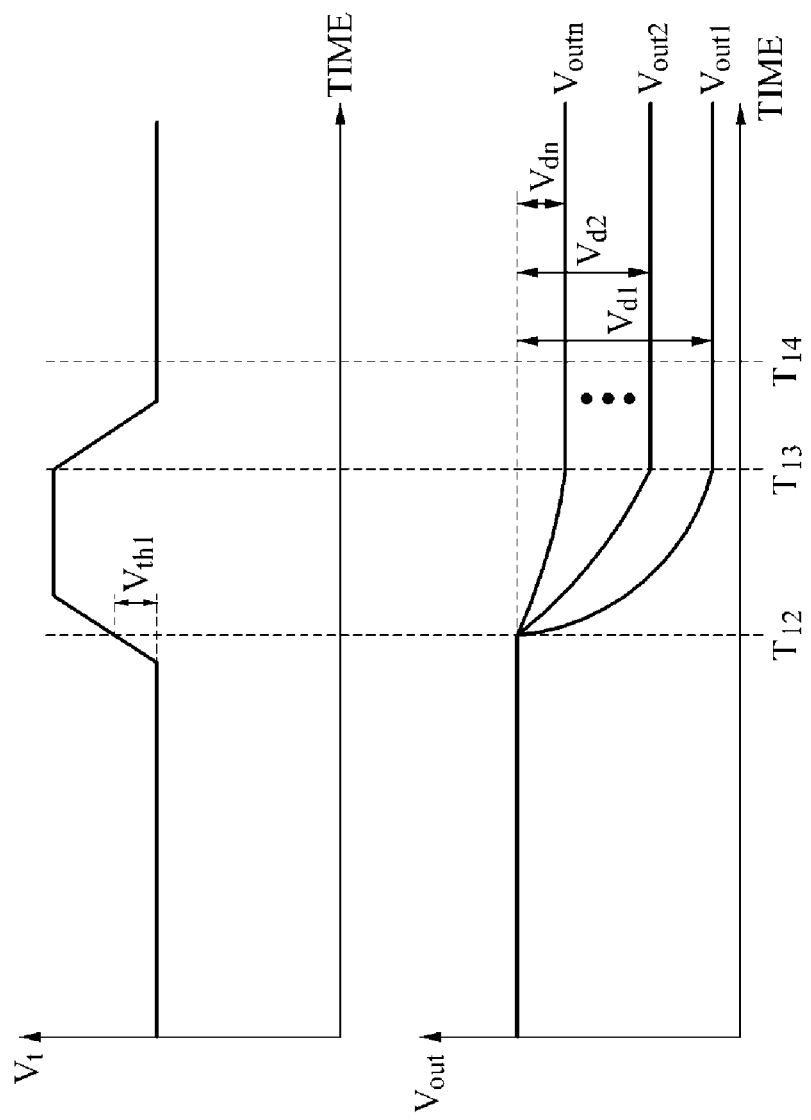
FIG. 7
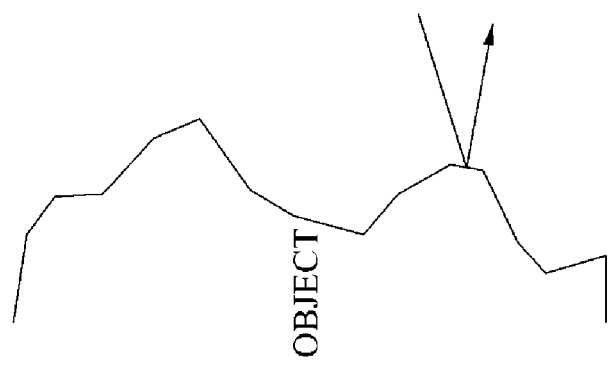

METHOD AND APPARATUS OF MEASURING DEPTH INFORMATION FOR 3D CAMERA

CROSS-REFERENCE TO RELATED APPLICATION(S)

This application claims the benefit under 35 U.S.C. §119 (a) of Korean Patent Application No. 10-2010-0107646, filed on Nov. 1, 2010, in the Korean Intellectual Property Office, the entire disclosure of which is incorporated herein by reference for all purposes.

BACKGROUND

1. Field

The following description relates to a method and apparatus for measuring depth information. Additionally, a method and apparatus for measuring depth information in a three-dimensional (3D) camera is provided.

2. Description of Related Art

As three-dimensional (3D) technologies have been relatively popular, demand for technologies that readily photograph 3D images has increased. A scheme of adding depth information to a two-dimensional (2D) image is an example of one scheme for providing 3D images. Cameras that photograph 3D images include, for example, a time of flight (TOF) camera. Schemes for measuring the TOF may be classified into two schemes. A first scheme is based on an intensity of light. Accordingly, an optical pulse is shot to an object, and the pulse is reflected from the object. In this example, when the reflected pulse is cut using a shutter, an intensity of light varies based on a reflected distance. A second scheme is based on a phase delay. Accordingly, a phase delay of a radio frequency (RF)-modulated signal varies based on a reflected distance from an object of a light source modulated to a high frequency.

SUMMARY

In one general aspect, there is provided a depth information measuring apparatus, the apparatus including a log converting unit to receive a light reflected from an object, and to output a log node voltage that is proportional to a log value of an intensity of the reflected light, a comparison outputting unit connected to an output of the log converting unit, for outputting a comparison node voltage of a second threshold value when the log node voltage increases by at least a first threshold value after activation of a first control signal, and at least one discharging unit connected to an output of the comparison outputting unit for discharging, based on a predetermined rule, an output node voltage until a second control signal is activated, when the output of the comparison outputting unit is equal to or greater than the second threshold value, wherein the output node voltage is charged, in advance, to a level of a source voltage, and wherein the second control signal is activated when the discharging is performed during a predetermined time.

The log converting unit may include an optical sensor to receive the light reflected from the object, and to convert the received light to a current, and a log output trans-impedance amplifier to output the log node voltage that is proportional to a log value of a magnitude of the current.

The comparison outputting unit may include a comparator with a first input port and a second input port, the second input port being connected to an input port of the comparison outputting unit, a buffer connected to the first input port of the comparator, and a first switch disposed between the buffer and the input port of the comparison outputting unit, wherein the first switch operates based on the first control signal, and wherein the comparator may output a comparison node voltage substantially equal to the second threshold value when a voltage of a second input port of the comparator is at least the first threshold value greater than a voltage of the first input port.

Each of the at least one discharging unit may charge a corresponding output node voltage to the level of the source voltage, based on whether a third control signal input to a corresponding discharging unit is activated.

Each of the at least one discharging unit may discharge the corresponding output node voltage at a different rate.

Each of the at least one discharging unit may include a discharger including an on-port and an off-port, a capacitor connected between a corresponding discharging unit and ground, and a second switch connected between the source voltage and an output node, the output node disposed between the discharger and the capacitor, wherein the second switch operates based on a third control signal, and wherein the discharger may operate in an active mode that discharges the output node voltage when a voltage greater than or equal to the second threshold value is input to the on-port, and operates in a sleep mode that stops the discharging based on the second control signal input to the off-port.

The capacitor included in each of the at least one discharging unit may have a different capacity.

The discharger included in each of the at least one discharging unit may have a different discharging rate.

The apparatus may further include a light source to output, in a direction of the object, a periodic optical pulse including light of at least two intensity levels, wherein the at least two intensity levels have values other than zero.

The lowest intensity level of light of the periodic optical pulse is higher than an intensity of ambient light.

The apparatus may further include a controller to control the comparison outputting unit based on the first control signal, and to control the at least one discharging unit based on the second control signal.

The controller may selectively control the at least one discharging unit based on an estimated distance to the object.

A discharging unit having a relatively fast discharging rate among the at least one discharging unit may be selected when the estimated distance is relatively short.

A discharging unit having a relatively slow discharging rate among the at least one discharging unit may be selected when the estimated distance is relatively long.

The apparatus may further include a processor to calculate depth information based on each change in output node voltage of the at least one discharging unit from before the discharging is performed to after the second control signal is activated.

In another general aspect, there is provided a depth information measuring method, the method including receiving a light reflected from an object, generating a log node voltage that is proportional to a log value of an intensity of the reflected light, generating, as an output of a comparison outputting unit, a comparison node voltage of a second threshold value when the log node voltage increases by at least a first threshold value after activation of a first control signal input to the comparison outputting unit, and discharging, based on a predetermined rule, an output node voltage of each of the at least one discharging unit until a second control signal input to a corresponding discharging unit is activated, when the output of the comparison outputting unit is greater than or equal to the second threshold value, wherein the output node voltage is charge, in advance, to a level of a source voltage, and wherein the second control signal may be activated when the discharging is performed during a predetermined time.

The generating of the log node voltage may convert the received light to a current and may generate the log node voltage that is proportional to a log value of a magnitude of the current.

The method may further include charging the output node voltage to the level of the source voltage, based on whether a third control signal input to each of the at least one discharging unit is activated.

The discharging may include discharging, by each of the at least one discharging unit, a corresponding output node voltage at a different rate.

The method may further include outputting, in a direction of the object, a periodic optical pulse including light of at least two intensity levels, wherein the at least two intensity levels have values other than zero.

The method may further include outputting a lowest intensity level of light of the period optical pulse is higher than an intensity of ambient light.

The method may further include calculating depth information based on each change in output node voltage from before the discharging is performed to after the second control signal is activated.

In another general aspect, there is provided a depth information measuring method, the method including generating an optical pulse toward an object, receiving the optical pulse, the optical pulse being reflected from the object as a reflected optical pulse, comparing a value measured with respect to the generated optical pulse with a value measured with respect to the reflected optical pulse, generating a discharge signal according to a result of the comparing, and determining the depth information according to a value measured with respect to the discharge signal a predetermined time after the generation of the optical pulse, wherein the discharge signal varies as a function of time.

Examples described herein may provide a depth information measuring method and apparatus that may output an optical pulse of which an intensity is greater than an intensity of an ambient light. Thus, interference of the ambient light may be reduced and depth information may be more accurately measured.

Examples described herein may provide a depth information measuring method and apparatus that may generate a voltage that is proportional to a log value of an intensity of a light reflected from an object and thus, may obtain relatively accurate depth information even when a reflection rate of a surface of the object is not uniform.

Examples described herein may provide a depth information measuring method and apparatus that may use discharging units respectively having dischargers of different discharging rate or respectively having capacitors of different capacities and thus, may increase a range of a measurable depth.

Examples described herein may provide a depth information measuring method and apparatus that may be integrated with a single chip based on a CMOS scheme and thus, may provide an economical implementation, for example, for a 3D recognition camera.

Other features and aspects may be apparent from the following detailed description, the drawings, and the claims.

BRIEF DESCRIPTION OF THE DRAWINGS

FIG. 7 is a graph illustrating a change in a log node voltage $V_t$ based on an operation of a depth information measuring apparatus that includes the plurality of discharging units illustrated in FIG. 6, and a change in an output node voltage $V_{out}$ for each of the plurality of discharging units.

Figure 1:
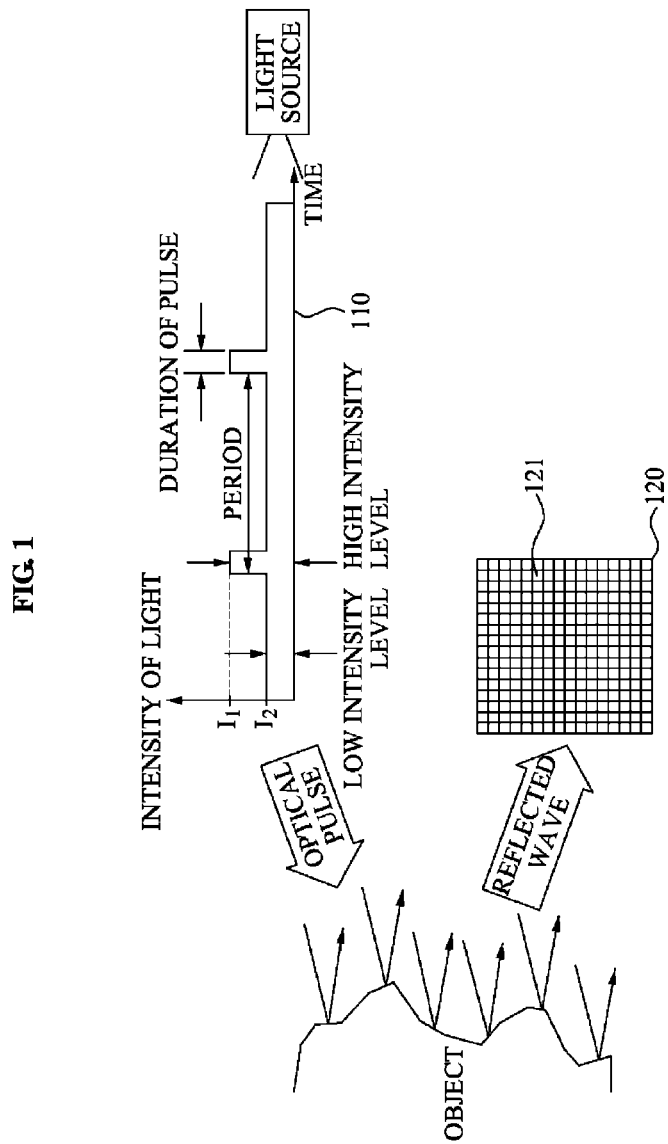
FIG. 1 is a diagram illustrating an example of an optical pulse that is output from a light source, reflected from an object, and entered to a depth sensor array.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Examples described herein provide a method and apparatus for relatively accurate and prompt measurement of depth information, and the method and apparatus may be applied to devices such as a three-dimensional (3D) camera and the like. For example, a depth information measuring apparatus may be used for measuring a distance between an object to each pixel of the 3D camera. The depth information measuring apparatus may be utilized by other devices in addition to the 3D camera.

FIG. 1 illustrates an example of an optical pulse 110 that is output from a light source, reflected from an object, and entered to a depth sensor array 120.

Referring to FIG. 1, the light source emits the optical pulse 110 toward the object. The optical pulse 110 may include light of at least two intensity levels, where the at least two intensity levels are values other than zero. For example, the optical pulse 110 may include a light of a low intensity level I1 and a light of a high intensity level I2. In this example, the light source may generate the optical pulse 110 such that the light of the low intensity level I1 has a higher intensity than an intensity of ambient light of the object or the depth information measuring apparatus. A period of the optical pulse 110 may be determined based on a frame rate of the 3D camera.

The optical pulse 110 output from the light source may be reflected from the object and thus may become a reflected wave, as illustrated in FIG. 1. Further, the reflected wave may arrive at the depth sensor array 120. The depth sensor array 120 may include a plurality of pixels, and each of the pixels, for example, a pixel 121, may be associated with a depth information measuring apparatus. The plurality of pixels may receive reflected waves that are reflected from different locations of a surface of the object. The depth information measuring apparatus associated with the pixel 121 may calculate depth information of the object based on the reflected wave received by the pixel 121. The depth information may indicate distance information associated with a distance between the depth information measuring apparatus and a predetermined point.

Figure 2:
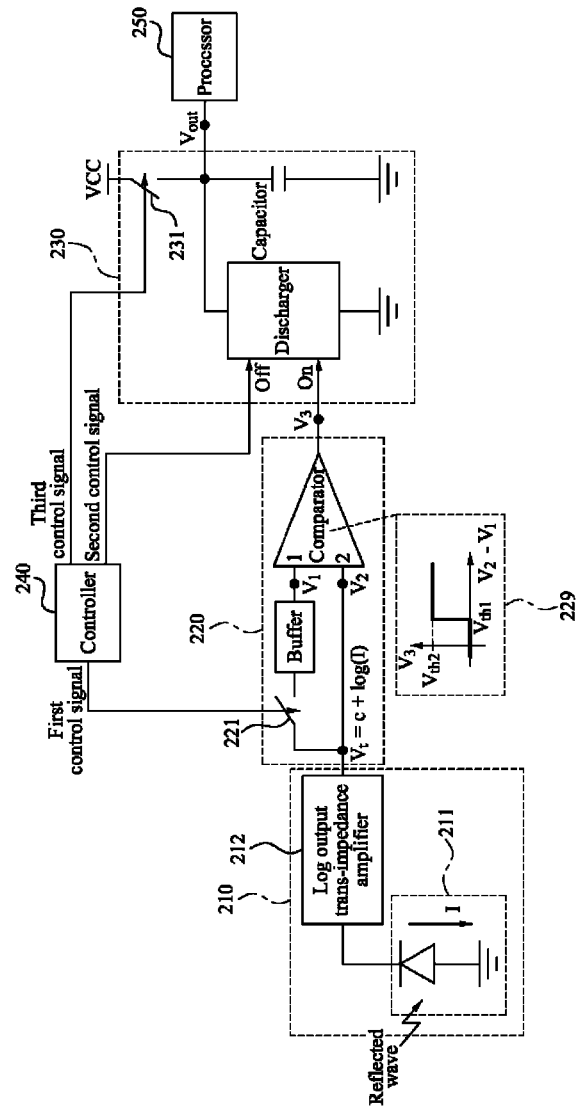
FIG. 2 is a diagram illustrating an example of a depth information measuring apparatus.

FIG. 2 illustrates an example of a depth information measuring apparatus.

Referring to FIG. 2, the depth information measuring apparatus may include a log converting unit 210, a comparison outputting unit 220, a discharging unit 230, a controller 240, and a processor 250.

The log converting unit 210 may receive a light reflected from an object, and may output a log node voltage $V_t$ that is proportional to a log value of an intensity of the reflected light.

The log converting unit 210 may include an optical sensor 211 that receives the light reflected from the object and coverts the received light to a current I. The log converting unit 210 may also include a log output trans-impedance amplifier 212 that is connected to the optical sensor 211 and outputs the log node voltage $V_t$ that is proportional to a log value of a magnitude of the converted current I. The log node voltage $V_t$ may be related to the converted current I according to Equation 1, where c may be a constant number.

$$V_t = c + \log(I) \quad \text{[Equation 1]}$$

The comparison outputting unit 220 may be connected to the log converting unit 210, and may output a comparison node voltage of a second threshold value $V_{th2}$ if a log node voltage $V_t$ increases by at least a first threshold value $V_{th1}$ after activation of a first control signal.

The comparison outputting unit 220 may include a comparator, a buffer that is connected to a first input port of the comparator, and a first switch that is connected between the buffer and an input port of the comparison outputting unit 220. The first switch may operate based on the first control signal.

The comparator may output a comparison node voltage $V_3$ of the second threshold value $V_{th2}$ if a voltage $V_2$ of a second input port of the comparator is at least the first threshold value $V_{th1}$ greater than a voltage $V_1$ of the first input port of the comparator. An example of the comparison node voltage $V_3$ output based on the voltage $V_1$ of the first input port and the voltage $V_2$ of the second input port is illustrated in a graph 229. When a difference between the voltage $V_2$ and the voltage $V_1$ (that is, $V_2-V_1$) is less than the first threshold voltage $V_{th1}$, the comparison node voltage $V_3$ may be substantially zero. The second input port of the comparator may be connected to the input port of the comparison outputting unit 220. The input port of the comparison outputting unit 220 may be connected to the output of the log converting unit 210.

The discharging unit 230 may be connected to the output of the comparison outputting unit 220. If the output of the comparison outputting unit 220 is equal to or greater than the second threshold value $V_{th2}$, the discharging unit 230 may discharge, based on a predetermined rule, an output node voltage $V_{out}$ until the second control signal is activated. The output node voltage $V_{out}$ may be charged, in advance, to a level of a source voltage $V_{cc}$.

The discharging unit 230 may include a discharger with an on-port and an off-port, a capacitor that is connected between the discharging unit 230 and ground, and a second switch 231 that is connected between the source voltage $V_{cc}$, and an output node. The output node may be disposed between the discharger and the capacitor, and the second switch 231 may operate based on a third control signal.

The discharger may operate in an active mode that discharges the output node voltage $V_{out}$ when a voltage of the second threshold value $V_{th2}$ is inputted to the on-port. Further, the discharger may operate in a sleep mode that stops the discharging based on the second control signal input to the off-port. The discharger may operate in the active mode when the comparison node voltage $V_3$ reaches the second threshold value $V_{th2}$, and the discharger may operate in the sleep mode when the second control signal is activated.

The discharging unit 230 may charge the output node voltage to a level of the source voltage $V_{cc}$, according to an activation of the third control signal input to the discharging unit 230. When the third control signal is activated, the second switch 231 may be turned on and thus, the capacitor may be charged.

The controller 240 may control the comparison outputting unit based on the first control signal, and may control the discharging unit 230 based on both the second control signal and the third control signal.

The processor 250 may calculate the depth information based on a change in an output node voltage $V_{out}$ of the discharger 230 from before the discharging is performed to after the second control signal is activated.

Figure 3:
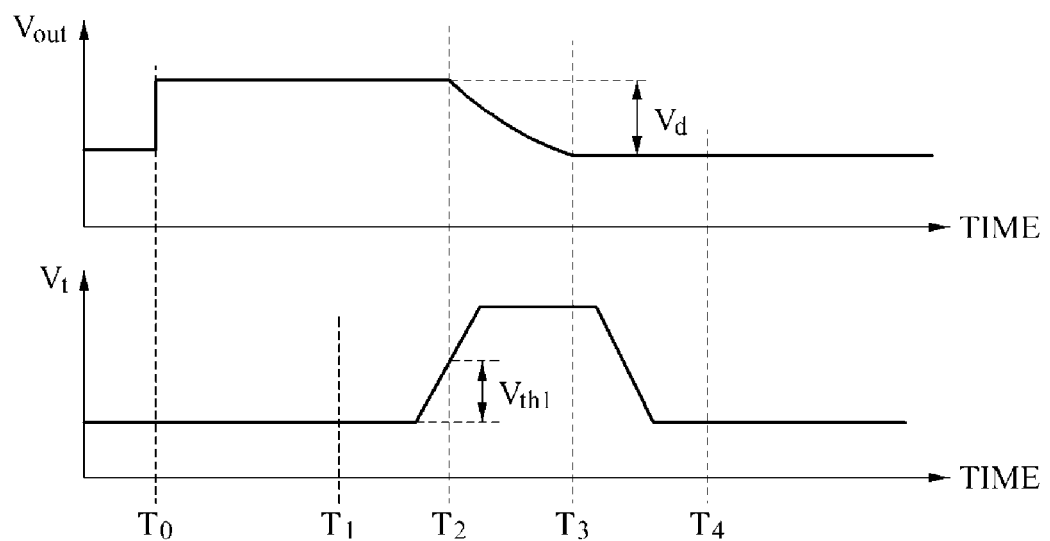
FIG. 3 is a graph illustrating a change in a log node voltage $V_t$ and a change in an output node voltage $V_{out}$ based on an operation of a depth information measuring apparatus.

FIG. 3 illustrates a change in a log node voltage $V_t$ and a change in an output node voltage $V_{out}$, based on an operation of a depth information measuring apparatus.

Referring to FIG. 3, at $T_0$, the depth information measuring apparatus may turn on a second switch by applying a third control signal when a discharger is in a sleep mode. Further at $T_0$, the depth information measuring apparatus may charge a capacitor to so that a voltage $V_{out}$ at the capacitor attains a voltage level of the source voltage $V_{cc}$, and the depth information measuring apparatus may also turn off the second switch when the charging is completed at $T_0$.

The depth information measuring apparatus may turn on a first switch by applying a first control signal at $T_1$. The log node voltage $V_t$ may be loaded to a buffer and such that V1=V2. The depth information measuring apparatus may turn off the first switch by applying the first control signal.

Subsequently, the depth information measuring apparatus may receive a reflected wave. If a light having a high intensity level included in the reflected wave is received, $V_t$ may increase. When $V_t$ increases by at least a first threshold value $Vth_1$, that is, $V_2-V_1 \geq Vth_1$, the discharger may operate in an active mode. Therefore, the capacitor may begin to discharge at $T_2$ and thus, the output node voltage $V_{out}$ may decrease.

When the discharging is performed during a predetermined time, the depth information measuring apparatus may control the discharger to operate in the sleep mode by applying the second control signal at $T_3$. A predetermined time after the depth information measuring apparatus outputs an optical pulse in a direction of an object, the depth information measuring apparatus may activate the second control signal so that the discharger may operate in a sleep mode.

The depth information measuring apparatus may calculate the depth information by measuring $V_d$ at $T_4$.

The depth information measuring apparatus may repeat the above described process in each of one or more frames.

Figure 4:
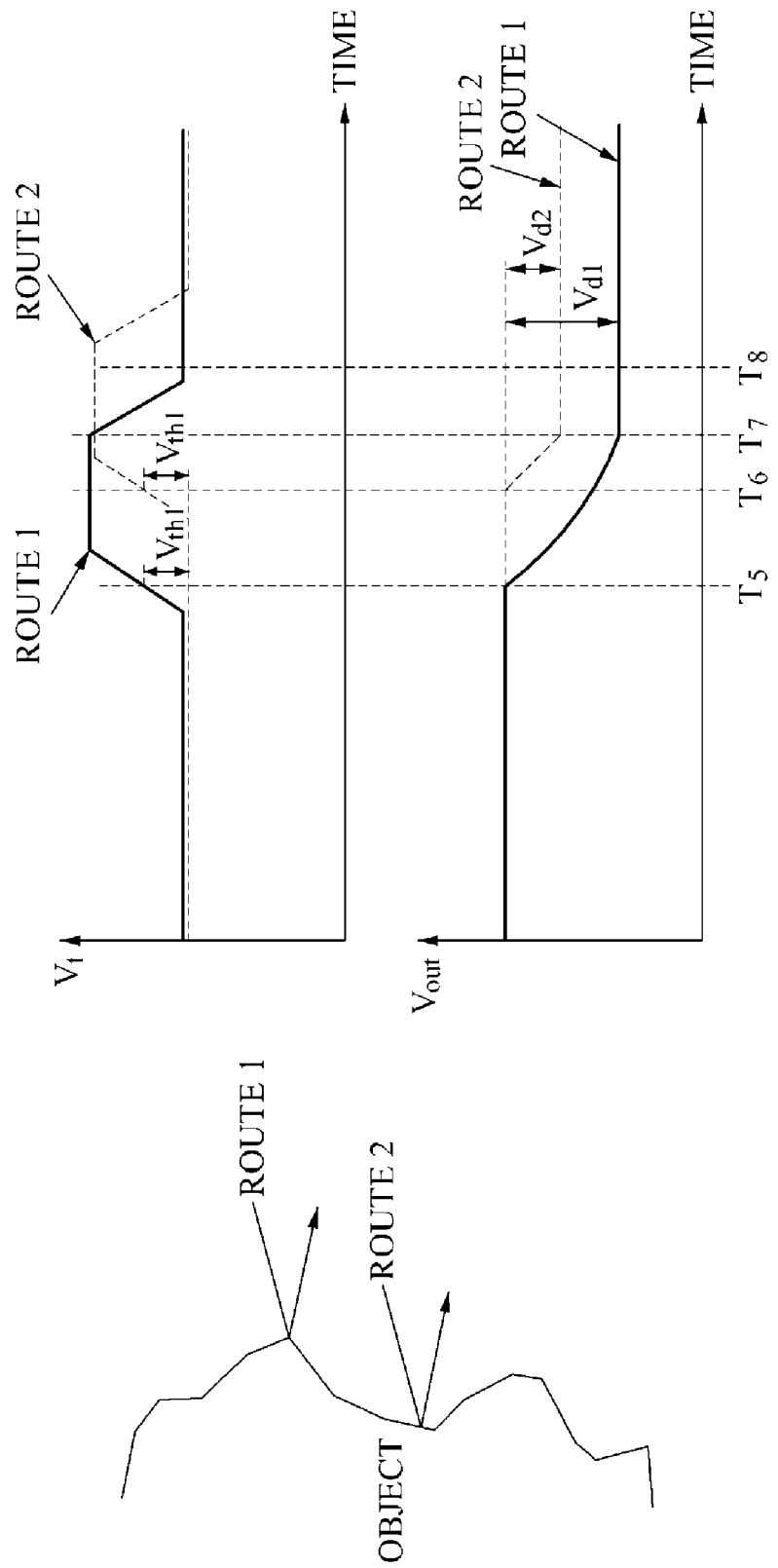
FIG. 4 is a graph illustrating a change in a log node voltage $V_t$ and a change in an output node voltage $V_{out}$ for each of two depth information measuring apparatuses that detect light reflected from locations, where the locations have different depths.

FIG. 4 illustrates a change in a log node voltage $V_t$ and a change in an output node voltage $V_{out}$ for each of two depth information measuring apparatuses that detect light reflected from locations, where the locations have different depths.

Referring to FIG. 4, a depth information measuring apparatus included in a pixel may correspond to a route 1, and may be referred to as a first route apparatus. A change in a voltage of depth information of the first route apparatus is illustrated by a solid line in FIG. 4. Similarly, another depth information measuring apparatus included in a pixel may correspond to a route 2, and may be referred to as a second route apparatus. A change in a voltage of depth information of the second route apparatus is illustrated by a dotted line in FIG. 4.

The route 1 and the route 2 may be associated with optical pulses output in a direction of an object at substantially the same time. As illustrated in the example of FIG. 4, the route 1 is shorter than the route 2 and thus, when a discharger of the first route apparatus begins operating in an active mode at $T_5$ may be earlier than when a discharger of the second route apparatus begins operating in an active mode at $T_6$.

After a predetermined time, the first route apparatus and the second route apparatus may be substantially simultaneously controlled to operate a sleep mode, as illustrated in FIG. 4 at $T_7$.

The first route apparatus may measure $V_{d1}$ and the second route apparatus may measure $V_{d2}$ and thus, the first route apparatus and the second route apparatus may calculate a depth of the route 1 and a depth of the route 2, respectively. Respective dischargers may operate in the active mode at different times, whereas the respective dischargers may operate the sleep mode at substantially the same time. Thus, respective output node voltages of the first route apparatus and the second route apparatus may be different from each other at $T_8$. Therefore, a lower output node voltage may indicate a shorter corresponding route.

Figure 5:
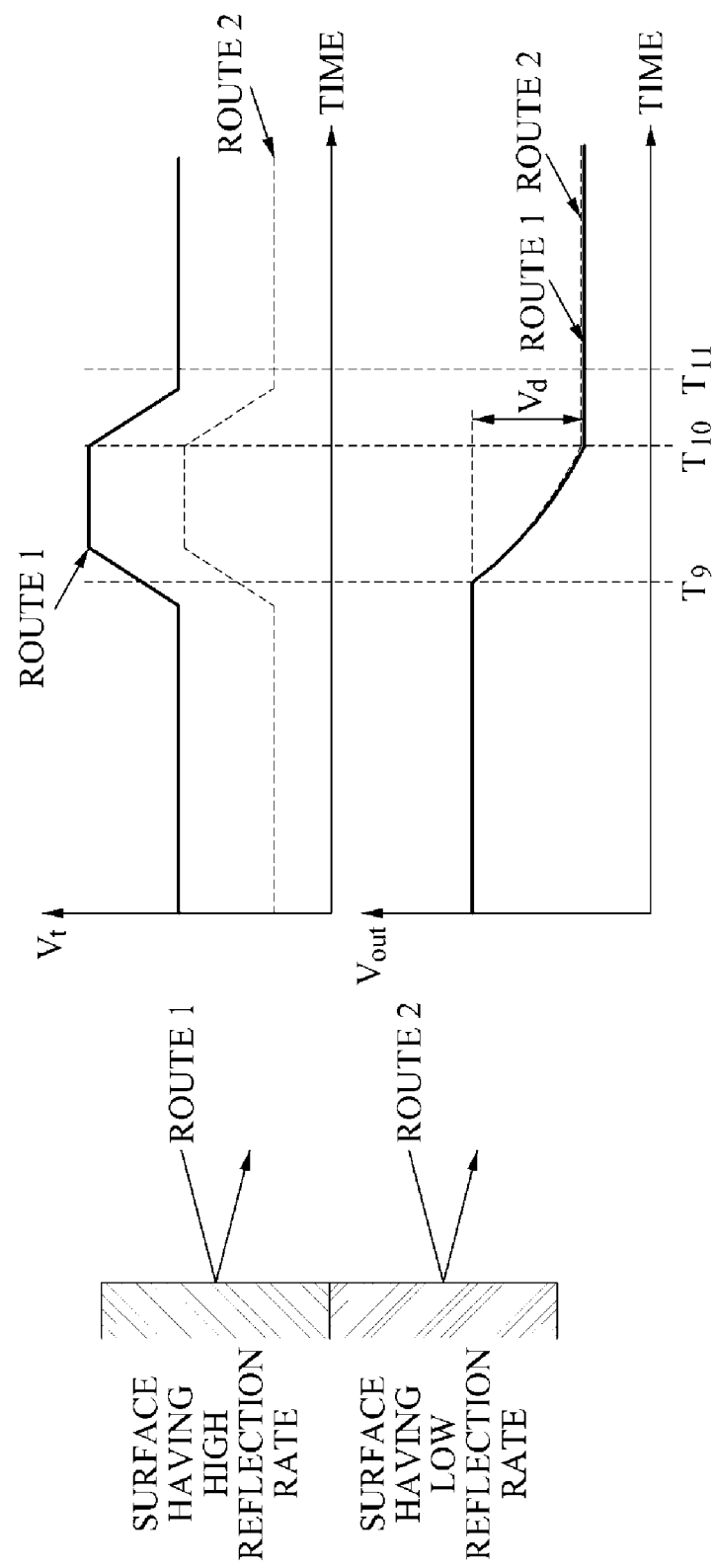
FIG. 5 is a graph illustrating a change in a log node voltage $V_t$ and a change in an output node voltage $V_{out}$ for each of two depth information measuring apparatuses that detect light reflected from different surfaces having different reflection rates.

FIG. 5 illustrates a change in a log node voltage $V_t$ and a change in an output node voltage $V_{out}$ for each of two depth information measuring apparatuses that detect light reflected from different surfaces having different reflection rates.

Referring to FIG. 5, a route 1 may be incident upon a surface having a high reflection rate, and a route 2 may be incident upon a surface having a low reflection rate. A depth information measuring apparatus included in a pixel may correspond to the route 1, and may be referred to as a first route apparatus. A change in a voltage of depth information of the first route apparatus is illustrated by a solid line in FIG. 5. Similarly, another depth information measuring apparatus included in a pixel may correspond to the route 2, and may be referred to as a second route apparatus. A change in a voltage of depth information of the second route apparatus is illustrated by a dotted line in FIG. 5.

The route 1 and the route 2 may be associated with optical pulses output in a direction of an object at substantially the same time. As illustrated in the example of FIG. 5, the surface of the route 1 and the surface of the route 2 have substantially the same depth and thus, respective dischargers of the first route apparatus and the second route apparatus may both begin operating in an active mode at $T_9$. The dischargers may begin operating in the active mode at substantially the same time since $V_t$ is set to be proportional to a log value of an intensity of a reflected wave. Therefore, a time elapsed for $V_t$ to increase by a first threshold value $V_{th1}$ may be substantially constant regardless of a reflection rate of a surface from which the reflected wave is reflected.

As an example, a reflection rate $I_1$ of the route 1 may be related to a reflection rate $I_2$ of the route 2, according to Equation 2.

$$I_1 = a \cdot I_2 \quad \text{[Equation 2]}$$

In Equation 2, a>1. A log node voltage $V_{t1}$ of the first route apparatus and a log node voltage $V_{t2}$ of the first route apparatus may be determined by Equation 3 and Equation 4, respectively.

$$V_{t1} = c + \log(I_1) \quad \text{[Equation 3]}$$

$$V_{t2} = c + \log(I_2) \quad \text{[Equation 4]}$$

In Equation 3 and Equation 4, c may be a constant number. When Equation 2 is substituted in Equation 3, Equation 3 may be modified as Equation 5.

$$\begin{aligned} V_{t1} &= c + \log(a \cdot I_2) \\ &= c + \log(a) + \log(I_2) \\ &= c_1 + \log(I_2) \end{aligned} \quad \text{[Equation 5]}$$

Here, $c_1 = c + \log(a)$. Accordingly, $V_{t1}$ and $V_{t2}$ may vary according to a difference of $\log(a)$. A time elapsed for $V_{t1}$ to increase by $V_{th1}$ and a time elapsed for $V_{t2}$ to increase by $V_{th1}$ may be substantially the same and thus, respective output node voltages $V_{out}$ of the first route apparatus and the second route apparatus may be substantially the same. Therefore, the depth information may be measured relatively accurately regardless of a reflection rate of a surface from which a reflected wave is reflected.

In FIG. 5, $T_9$ may denote a time when the respective dischargers of the first route apparatus and the second route apparatus begin operating in an active mode, $T_{10}$ may denote a time when the respective dischargers begin operating in a sleep mode, and $T_{11}$ may denote a time when $V_{out}$ is measured.

Figure 6:
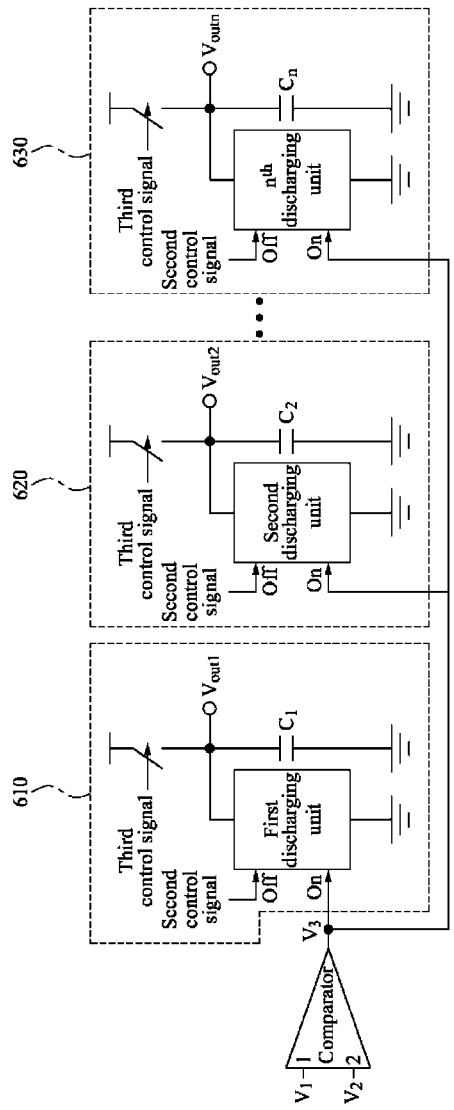
FIG. 6 is a diagram illustrating a plurality of discharging units that may be included in a depth information measuring apparatus.

FIG. 6 illustrates a plurality of discharging units that may be included in a depth information measuring apparatus.

The depth information measuring apparatus may include the plurality of discharging units that are connected between a comparison outputting unit and a processor. For example, the depth information measuring apparatus may include n discharging units, for example, a first discharging unit 610, a second discharging unit 620, . . . , and an $n^{th}$ discharging unit 630. In this example, an on-port of a discharger included in each of the discharging units may be connected to an output of the comparator. An output node of each of the discharging units may be connected to the processor. The processor may measure an output node voltage of each of the discharging units.

The plurality of discharging units may respectively discharge output node voltages at different times. The plurality of discharging units may respectively include capacitors having different capacities. Respective dischargers of the plurality of discharging units may discharge at different rates in an active mode. Further, the respective dischargers of the plurality of discharging units may be different from each other.

FIG. 7 illustrates a change in a log node voltage $V_t$ based on an operation of a depth information measuring apparatus that includes the plurality of discharging units illustrated in FIG. 6, and a change in an output node voltage $V_{out}$ for each of the plurality of discharging units.

When discharging rates of respective discharging units included in a depth information measuring apparatus are different from each other, the depth information measuring apparatus may measure various ranges of depths as compared with a depth information measuring apparatus including discharging units with similar discharging rates. When a distance to an object is relatively long, the depth information measuring apparatus may obtain depth information using a discharging unit that has a relatively slow discharging rate. Accordingly, when the distance to the object is relatively short, the depth information measuring apparatus may obtain the depth information using a discharging unit that has a relatively fast discharging rate. The depth information measuring apparatus may also use a plurality of discharging units to measure the depth information.

The depth information measuring apparatus may measure the depth information using an appropriate discharging unit based on the distance to the object and thus, a range of measurable depth may be improved and an accuracy of measured depth information may be enhanced.

Figure 8:
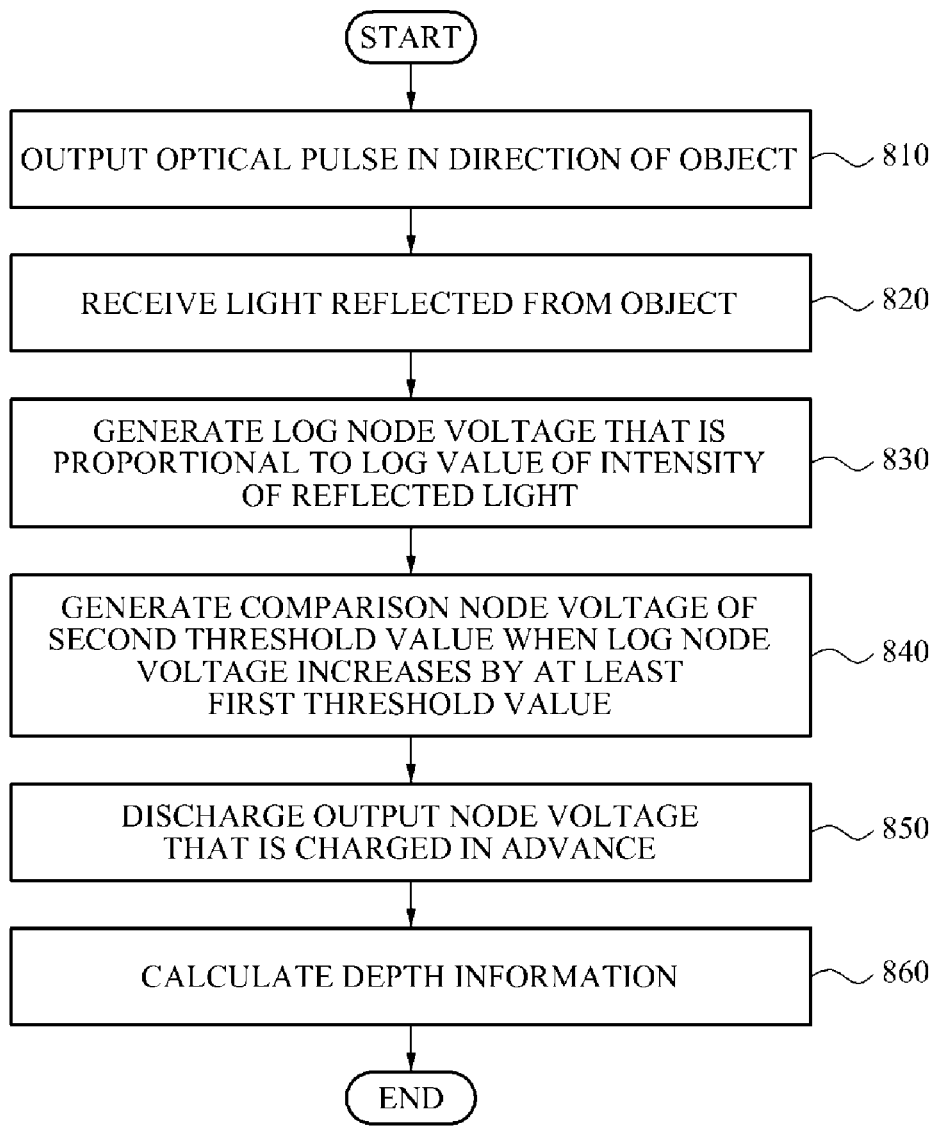
FIG. 8 is a flowchart illustrating a depth information measuring method.

FIG. 8 illustrates a depth information measuring method.

In operation 810, a depth information measuring apparatus may output, in a direction of an object, a periodic optical pulse including light of at least two intensity levels, where the at least two intensity levels are values other than zero. In this example, a light of a lowest intensity level among the light of the at least two intensity levels included in the optical pulse may have a higher intensity than an intensity of ambient light.

The depth information measuring apparatus may charge an output node voltage to a level of a source voltage, based on whether a third control signal inputted to each of at least one discharging unit included in the information measuring apparatus is activated.

The depth information measuring apparatus may receive a light reflected from the object in operation 820.

The depth information measuring apparatus may generate a log node voltage $V_t$ that is proportional to a log value of an intensity of the reflected light in operation 830. In this example, the depth information measuring apparatus may convert the received light to a current, and may generate the log node voltage $V_t$ that is proportional to a log value of magnitude of the converted current.

In operation 840, the depth information measuring apparatus may generate, as an output of a comparison node, a comparison node voltage of a second threshold value if a log node voltage $V_t$ increases by at least a first threshold value after the activation of a first control signal input to the comparison unit.

When the output of the comparison outputting unit is greater than or equal to the second threshold value, each of the at least one discharging unit included in the depth information measuring apparatus may discharge, based on a predetermined rule, a corresponding output node voltage until a second control signal input to a corresponding discharging unit is activated in operation 840. The output node voltage may be charged, in advance, to a level of the source voltage. In this example, the second control signal may be activated when the discharging is performed during a predetermined time. Each of the at least one discharging unit may discharge a corresponding output node voltage at a different rate.

In operation 860, the depth information measuring apparatus may calculate depth information based on each change in output node voltage of the at least one discharging unit from before the discharging is performed to after the second control signal is activated.

A depth information measuring method has been described with respect to FIG. 8. The examples of a depth information measuring apparatus described with reference to FIGS. 1 through 7 may be applicable to the depth information measuring method and thus, detailed descriptions thereof will be omitted.

Furthermore, the example apparatuses and method of measuring depth information may be applied to a three-dimensional (3D) imaging system, for example, a camera for capturing 3D images.

The units described herein may be implemented using hardware components and software components. For example, log converting units, comparison output units, discharging units, controllers, and processors. A processor may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for measuring depth information, the apparatus comprising:
   a log converting unit configured to receive a light reflected from an object, and to output a log node voltage that is proportional to a log value of an intensity of the reflected light;
   a comparison outputting unit connected to an output of the log converting unit, and configured to output a comparison node voltage of a second threshold value when the log node voltage increases by at least a first threshold value after activation of a first control signal,
   wherein the comparison outputting unit comprises:
   a comparator with a first input port and a second input port, the second input port being connected to an input port of the comparison outputting unit;
   a buffer connected to the first input port of the comparator; and
   a first switch disposed between the buffer and the input port of the comparison outputting unit,
   wherein the first switch operates based on the first control signal, and
   wherein the comparator outputs a comparison node voltage substantially equal to the second threshold value when a voltage of a second input port of the comparator is at least the first threshold value greater than a voltage of the first input port; and
   at least one discharging unit connected to an output of the comparison outputting unit and configured to discharge, based on a predetermined rule, an output node voltage until a second control signal is activated when the output of the comparison outputting unit is equal to or greater than the second threshold value,
   wherein the output node voltage is charged, in advance, to a level of a source voltage,
   wherein the second control signal is activated when the discharging is performed during a predetermined time, and
   wherein each of the at least one discharging unit discharges the corresponding output node voltage at a different rate.

2. The apparatus of claim 1, wherein the log converting unit comprises:
   an optical sensor configured to receive the light reflected from the object, and to convert the received light to a current; and
   a log output trans-impedance amplifier configured to output the log node voltage that is proportional to a log value of a magnitude of the current.

3. The apparatus of claim 1, wherein each of the at least one discharging unit charges a corresponding output node voltage to the level of the source voltage, based on whether a third control signal input to a corresponding discharging unit is activated.

4. The apparatus of claim 1, wherein each of the at least one discharging unit comprises:
   a discharger including an on-port and an off-port;
   a capacitor connected between a corresponding discharging unit and ground; and
   a second switch connected between the source voltage and an output node, the output node disposed between the discharger and the capacitor,
   wherein the second switch operates based on a third control signal, and
   wherein the discharger operates in an active mode that discharges the output node voltage when a voltage greater than or equal to the second threshold value is input to the on-port, and operates in a sleep mode that stops the discharging based on the second control signal input to the off-port.

5. The apparatus of claim 4, wherein the capacitor included in each of the at least one discharging unit has a different capacity.

6. The apparatus of claim 4, wherein the discharger included in each of the at least one discharging unit has a different discharging rate.

7. The apparatus of claim 1, further comprising:
   a light source configured to output, in a direction of the object, a periodic optical pulse including light of at least two intensity levels, wherein the at least two intensity levels have values other than zero.

8. The apparatus of claim 7, wherein the lowest intensity level of light of the periodic optical pulse is higher than an intensity of ambient light.

9. The apparatus of claim 1, further comprising:
   a controller configured to control the comparison outputting unit based on the first control signal, and to control the at least one discharging unit based on the second control signal.

10. The apparatus of claim 9, wherein the controller selectively controls the at least one discharging unit based on an estimated distance to the object.

11. The apparatus of claim 10, wherein a discharging unit having a relatively fast discharging rate among the at least one discharging unit is selected when the estimated distance is relatively short.

12. The apparatus of claim 10, wherein a discharging unit having a relatively slow discharging rate among the at least one discharging unit is selected when the estimated distance is relatively long.

13. The apparatus of claim 1, further comprising:
   a processor configured to calculate depth information based on each change in output node voltage of the at least one discharging unit from before the discharging is performed to after the second control signal is activated.

14. A method of measuring depth information, the method comprising:
   receiving a light reflected from an object;
   generating a log node voltage that is proportional to a log value of an intensity of the reflected light;
   generating, as an output of a comparison outputting unit, a comparison node voltage of a second threshold value when the log node voltage increases by at least a first threshold value after activation of a first control signal input to the comparison outputting unit
   wherein the comparison outputting unit comprises:
   a comparator with a first input port and a second input port, the second input port being connected to an input port of the comparison outputting unit;
   a buffer connected to the first input port of the comparator; and
   a first switch disposed between the buffer and the input port of the comparison outputting unit,
   wherein the first switch operates based on the first control signal, and
   wherein the comparator outputs a comparison node voltage substantially equal to the second threshold value when a voltage of a second input port of the comparator is at least the first threshold value greater than a voltage of the first input port; and
   discharging, by at least one discharging unit and based on a predetermined rule, an output node voltage of each of the at least one discharging unit until a second control signal input to a corresponding discharging unit is activated when the output of the comparison outputting unit is greater than or equal to the second threshold value, wherein the output node voltage is charged, in advance, to a level of a source voltage, and wherein the second control signal is activated when the discharging is performed during a predetermined time, and wherein the discharging comprises discharging, by each of the at least one discharging unit, a corresponding output node voltage at a different rate.

15. The method of claim 14, wherein the generating of the log node voltage comprises converting the received light to a current and generating the log node voltage that is proportional to a log value of a magnitude of the current.

16. The method of claim 14, further comprising:
charging the output node voltage to the level of the source voltage, based on whether a third control signal input to each of the at least one discharging unit is activated.

17. The method of claim 14, further comprising:
outputting, in a direction of the object, a periodic optical pulse including light of at least two intensity levels, wherein the at least two intensity levels have values other than zero.

18. The method of claim 17, wherein the outputting comprises:
outputting a lowest intensity level of light of the periodic optical pulse is higher than an intensity of ambient light.

19. The method of claim 14, further comprising:
calculating depth information based on each change in output node voltage from before the discharging is performed to after the second control signal is activated.

20. A method of measuring depth information, the method comprising:
generating an optical pulse toward an object;
receiving a reflected optical signal resulting from the optical pulse being reflected from the object;
generating a log node voltage that is proportional to a log value of an intensity of the reflected optical signal;
generating, as an output of a comparison outputting unit, a comparison node voltage of a second threshold value when the log node voltage increases by at least a first threshold value after activation of a first control signal input to the comparison outputting unit,
wherein the comparison outputting unit comprises:
a comparator with a first input port and a second input port, the second input port being connected to an input port of the comparison outputting unit;
a buffer connected to the first input port of the comparator; and
a first switch disposed between the buffer and the input port of the comparison outputting unit,
wherein the first switch operates based on the first control signal, and
wherein the comparator outputs a comparison node voltage substantially equal to the second threshold value when a voltage of a second input port of the comparator is at least the first threshold value greater than a voltage of the first input port
generating a discharge signal based on the log node voltage; and
determining the depth information according to a value measured with respect to the discharge signal a predetermined time after the generation of the optical pulse,
wherein the discharge signal varies as a function of time, and
wherein the discharge signal is outputted at a different rate for each of at least one discharging unit.

* * * * *